United States Patent Office.

GEORGE V. SHEFFIELD AND JOHN A. SHEFFIELD, OF NORTHBRIDGE CENTRE, MASSACHUSETTS.

Letters Patent No. 99,959, dated February 15, 1870.

IMPROVED MEDICAL COMPOUND.

The Schedule referred to in these Letters Patent and making part of the same.

*To all whom it may concern:*

Be it known that we, GEORGE V. SHEFFIELD and JOHN A. SHEFFIELD, of Northbridge Centre, in the county of Worcester, and State of Massachusetts, have invented a new and improved Medical Compound; and we do hereby declare that the following is a full, clear, and exact description thereof, which will enable others skilled in the art to make and use the same.

Our invention has for its object to furnish an improved medical compound, simple in its composition, and effective as a blood purifier, and as a sure remedy for many diseases, such as scrofula, salt-rheum, dyspepsia, liver complaints, worms, jaundice, &c.; and It consists of the compound composed of the ingredients and prepared in the manner hereinafter more fully described.

In preparing this compound we take the root of the barberry tree or shrub, and after it is thoroughly dried it is steeped or distilled. The extract thus obtained is then mixed with cider, brandy, whisky, rum, gin, alcohol, or other suitable spirit.

A suitable quantity of sugar is added to the mixture, which is then put into casks or other suitable vessels, and revolved very rapidly to foam, mix, and purify the compound.

Whole nutmegs are also put into the cask or vessel in which the compound is to be revolved, to cause it to foam, and also to slightly flavor it.

The revolution of the compound may be continued for six weeks, more or less, the precise time being immaterial, but the longer the better.

When this operation is completed, the compound may be drawn off and bottled ready for use. When convenient the bottles should be kept in vaults for the better preservation of the compound; but this is not essential, as the compound will keep in any climate or at any temperature.

Having thus described our invention,

We claim as new and desire to secure by Letters Patent—

An improved medical compound, composed of the ingredients and prepared in the manner substantially as herein shown and described and for the purpose set forth.

The above specification of our invention signed by us, this 7th day of December, 1869.

GEORGE V. SHEFFIELD.
JOHN A. SHEFFIELD.

Witnesses:
JOEL BACHELOR,
GEO. W. LIVERMORE.